(12) United States Patent
Kubby et al.

(10) Patent No.: US 6,968,100 B2
(45) Date of Patent: Nov. 22, 2005

(54) MEMS WAVEGUIDE SHUTTLE OPTICAL LATCHING SWITCH

(75) Inventors: Joel A. Kubby, Rochester, NY (US); Kathleen A. Feinberg, Rochester, NY (US); Kristine A. German, Webster, NY (US); Peter M. Gulvin, Webster, NY (US); Jun Ma, Penfield, NY (US); Pinyen Lin, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 135 days.

(21) Appl. No.: 10/712,200

(22) Filed: Nov. 12, 2003

(65) Prior Publication Data

US 2004/0184709 A1 Sep. 23, 2004

Related U.S. Application Data

(60) Provisional application No. 60/456,087, filed on Mar. 19, 2003.

(51) Int. Cl.⁷ .............................. G02B 6/26; G02B 6/42
(52) U.S. Cl. ............................. 385/16; 385/20; 385/21
(58) Field of Search .................................. 385/16–23

(56) References Cited

U.S. PATENT DOCUMENTS

| | | | |
|---|---|---|---|
| 5,078,514 A | 1/1992 | Valette et al. | 385/20 |
| 5,612,815 A * | 3/1997 | Labeye et al. | 359/320 |
| 5,909,078 A | 6/1999 | Wood et al. | 310/307 |
| 6,229,640 B1 | 5/2001 | Zhang | 359/290 |
| 6,236,139 B1 | 5/2001 | Hill et al. | 310/307 |
| 6,255,757 B1 | 7/2001 | Dhuler et al. | 310/307 |
| 6,303,885 B1 | 10/2001 | Hichwa et al. | 200/181 |
| 6,388,359 B1 | 5/2002 | Duelli et al. | 310/309 |
| 6,407,478 B1 | 6/2002 | Wood et al. | 310/307 |
| 6,428,173 B1 | 8/2002 | Dhuler et al. | 359/872 |
| 6,590,313 B2 | 7/2003 | Agrawal et al. | 310/307 |
| 2002/0011758 A1 * | 1/2002 | Agrawal et al. | 310/307 |
| 2004/0020968 A1 | 2/2004 | Howell et al. | 228/103 |

FOREIGN PATENT DOCUMENTS

| | | | |
|---|---|---|---|
| EP | 1 081 391 | 3/2001 | F15C 5/00 |
| WO | WO 01/11411 | 2/2001 | G02B 26/02 |
| WO | WO 02/23606 | 3/2002 | H01L 21/306 |

OTHER PUBLICATIONS

Lee et al. "Suface-Micromachined Free-Space Fiber Optic Switches With Integrated Microactuators for Optical Fiber Communication Systems." 1997 International Conference on Solid-Sate Sensors and Actuators, Jun. 16-19, 1997, p. 85-88.*

(Continued)

Primary Examiner—Frank G. Font
Assistant Examiner—Derek L. Dupuis
(74) Attorney, Agent, or Firm—Oliff & Berridge, PLC (57) ABSTRACT

An optical micro-electro-mechanical system (MEMS) switch is disclosed. In a preferred embodiment the optical MEMS switch is used as an M×N optical signal switching system. The optical MEMS switch comprises a plurality of optical waveguides formed on a shuttle for switching optical states wherein the state of the optical switch is changed by a system of drive and latch actuators. The optical MEMS switch utilizes a latching mechanism in association with a thermal drive actuator for aligning the waveguide shuttle. In use the optical MEMS switch may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

18 Claims, 7 Drawing Sheets

OTHER PUBLICATIONS

Lee, Shi-Sheng et al., "Surface Micromachined Free-Space Fiber Optic Switches with Integrated Microactuators for Optical Fiber Communication Systems", 1997 International Conference on Solid-State Sensors and Actuators, Jun. 16-19, 1997, pp. 85-88.

Watts, R. and Soref, R.A., "Electromechanical Optical Switching and Modulation in Micromachined Silicon-on-Insulator Waveguides", IEEE Int. SOI Conference Proceedings, 1991, p. 62.

Eng, T.T.H.; Sin, S.S.Y.; Kan, S.C. and Wong, G.K.L., "Surface-micromachined Movable SOI Optical Waveguides", Transducers '95, 8th Int. Conf. on Solid-State Sensors and Actuators, and Eurosensors IX, 1995, pp. 348-350.

Eng, T.T.H.; Sin, S.S.Y.; Kan, S.C. and Wong, G.K.L., "Micromechnical Optical Switching with Voltage Control Using SOI Movable Integrated Optical Waveguides", IEEE Photonics Tech. Letters, vol. 7, No. 11, Nov. 1995, pp. 1297-1299.

Ollier, E. and Mottier, P., "Integrated electrostatic microswitch for optical fibre networks driven by low voltage", Electronics Letters, Oct. 10, 1996, vol. 32, No. 21, pp. 2007-2009.

Bezzaoui, H. and Voges, E., "Integrated optics combined with micromechanics on silicon", Sensors and Actuators A. 29 (1991), pp. 219-223.

Ollier, E; Chabrol, C.; Enot T.; Brunet-Manquat, P.; Margail, J. and Mottier, P., "1×8 Micro-Mechanical Switches Based on Moving Waveguides for Optical Fiber Network Switching", IEEE, 2000.

Ollier, E; Labeye, P. and Revol, F, "Micro-opto mechanical switch integrated on silicon", Electronics Letters, Nov. 9, 1995, vol. 31, No. 23, pp. 2003-2005.

U.S. Appl. No. 10/703,382.
U.S. Appl. No. 10/721,724.
U.S. Appl. No. 10/721,203.

* cited by examiner

MEMS WAVEGUIDE SHUTTLE OPTICAL LATCHING SWITCH

CROSS REFERENCE TO RELATED APPLICATIONS

This application claims the benefit of Provisional Patent Application No. 60/456,087, filed Mar. 19, 2003.

Attention is directed to now abandoned provisional applications U.S. Provisional Application No. 60/456,086, filed Mar. 19, 2003, entitled, "M×N Cantilever Beam Optical Waveguide Switch" and U.S. Provisional Application No. 60/456,063, filed Mar. 19, 2003, entitled, "MEMS Optical Latching Switch". The disclosure of each of these copending provisional applications is hereby incorporated by reference in their entirety.

BACKGROUND

This invention in embodiments relates to microelectromechanical system (MEMS) switches and more particularly to multiple state optical latching switches.

The telecommunications industry is undergoing dramatic changes with increased competition, relentless bandwidth demand, and a migration toward a more data-centric network architecture. First generation point-to-point wave division multiplex systems have eased the traffic bottleneck in the backbone portion of a network. As a new cross-connect architecture moves the technology closer to the subscriber side of the network, operators are challenged to provide services at the optical layer, calling for more flexible networks that can switch and reroute wavelengths. This is placing great emphasis and demand for wavelength agile devices.

The need to provide services "just in time" by allocation of wavelengths, and further migration of the optical layer from the high-capacity backbone portion to the local loop, is driving the transformation of the network toward an all optical network in which basic network requirements will be performed in the optical layer.

The optical network is a natural evolution of point-to-point dense wavelength division multiplexing (DWDM) transport to a more dynamic, flexible, and intelligent networking architecture to improve service delivery time. The main element of the optical network is the wavelength (channel), which will be provisioned, configured, routed, and managed in the optical domain. Intelligent optical networking will be first deployed as an "opaque" network in which periodic optical-electrical conversion will be required to monitor and isolate signal impairments. Longer range, the optical network will evolve to a "transparent" optical network in which a signal is transported from its source to a destination totally within the optical domain.

A key element of the emerging optical network is an optical add/drop multiplexer (OADM). An OADM will drop or add specific wavelength channels without affecting the through channels. Fixed OADMs can simplify the network and readily allow cost-effective DWDM migration from simple point-to-point topologies to fixed multi-point configurations. True dynamic OADM, in which reconfiguration is done in the optical domain without optical-electrical conversion, would allow dynamically reconfigurable, multi-point DWDM optical networks. This dynamically reconfigurable multi-point architecture is slated to be the next major phase in network evolution, with true OADM an enabling network element for this architecture.

On chip integration of optical switching and planar light circuits has the potential to greatly reduce the size and manufacturing costs of multi-component optical equipment such as Reconfigurable Optical Add/Drop Multiplexers (ROADMs). Current costs for Reconfigurable Optical Add/Drop Multiplexers (ROADMs) are $1,000 per channel, limiting their use to long-haul optical telecommunications networks. In order to extend their use into the metropolitan network the cost will need to be decreased by an order of magnitude to $100 per channel, without sacrificing performance.

One solution to decreasing cost is through the integration of components, where the primary cost savings will be in packaging. A number of approaches are being pursued for optical integration using Planar Light Circuit (PLC) technologies. The majority of approaches use a silica-on-silicon platform with the ROADM formed from the integration of silica Arrayed Waveguide Gratings (AWG's) for multiplexing and demultiplexing, with Thermo-Optic (TO) switches for performing the add/drop and pass of the demultiplexed signal. The use of a low-index contrast silica-on-silicon platform severely limits the yield of these components due to the requirement for uniform thick oxide films over large areas to form the waveguides. The use of TO switches limits the extensibility due to high-power requirements and thermal cross-talk.

A number of different materials and switching technologies are being explored for fabricating chip-scale photonic lightwave circuits such as AWG's for demultiplexers and multiplexers, Variable Optical Attenuators (VOA's) and Reconfigurable Optical Add-Drop Multiplexers (ROADMs). The main material platforms include silica wafers, silica-on-silicon substrates using both thin film deposition and wafer bonding techniques, polymer waveguides defined on silicon substrates, and silicon-on-insulator substrates. The main switching technologies include Mach-Zehnder interferometers based on either a thermo-optic or electro-optic effect, and MEMS mechanical waveguide switches.

While silica waveguides have optical properties that are well matched to the optical properties of conventional single mode fibers, and thus couple well to them, they require thick cladding layers due to the low index of refraction contrast between the waveguide core and cladding materials, making them difficult to fabricate using planar processing techniques for fabrication and integration with other on-chip optical devices. The low index of refraction contrast, $\Delta n$, between core and cladding also requires large bending radii to limit optical loss during propagation through the photonic lightwave circuit, leading to large chip footprints and low die yields (<50%).

In addition, silica based waveguide switches are typically based on Mach-Zehnder interference using thermo-optic effects, that have a limited Extinction Ratio (ER) of around 25–30 dB, require significant power due to the low thermo-optic coefficient of silica, have problems with thermal cross-talk between the different optical channels and have a sinusoidal rather than a digital optical response. They also lose their switching state when power is lost.

What is needed is a Silicon-On-Insulator (SOI) platform for monolithically integrating optical, mechanical and electrical functions. The use of a silicon platform enables fabrication of components using the vast infrastructure and process development available for semiconductor IC manufacturing at silicon foundries. By fabricating the MEMS switches and waveguides in the same material, single crystal silicon, there are no stress and strain issues as exist with heterogeneous materials sets such as silica-on-silicon. Fabrication in silicon also allows for integration with CMOS microelectronics for control and sensing capabilities, and for free-carrier plasma dispersion effects to enable signal leveling using integrated VOA's. The high index contrast of silicon (n=3.5) enables the ridge waveguide structures to make tight turns with minimum optical bending loss, decreasing overall chip size to centimeter dimensions.

SUMMARY

An optical micro-electro-mechanical system (MEMS) switch is disclosed. In a preferred embodiment the optical MEMS switch is used as an M×N optical signal switching system. The optical MEMS switch comprises a plurality of optical waveguides formed on a waveguide shuttle for switching optical states wherein the state of the optical switch is changed by a system of drive and latch actuators. The optical MEMS device utilizes a latching mechanism in association with a thermal drive actuator for aligning the waveguide shuttle. In use the optical MEMS device may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

BRIEF DESCRIPTION OF THE DRAWINGS

The drawings are not to scale and are only for purposes of illustration.

DETAILED DESCRIPTION

Figure 1:
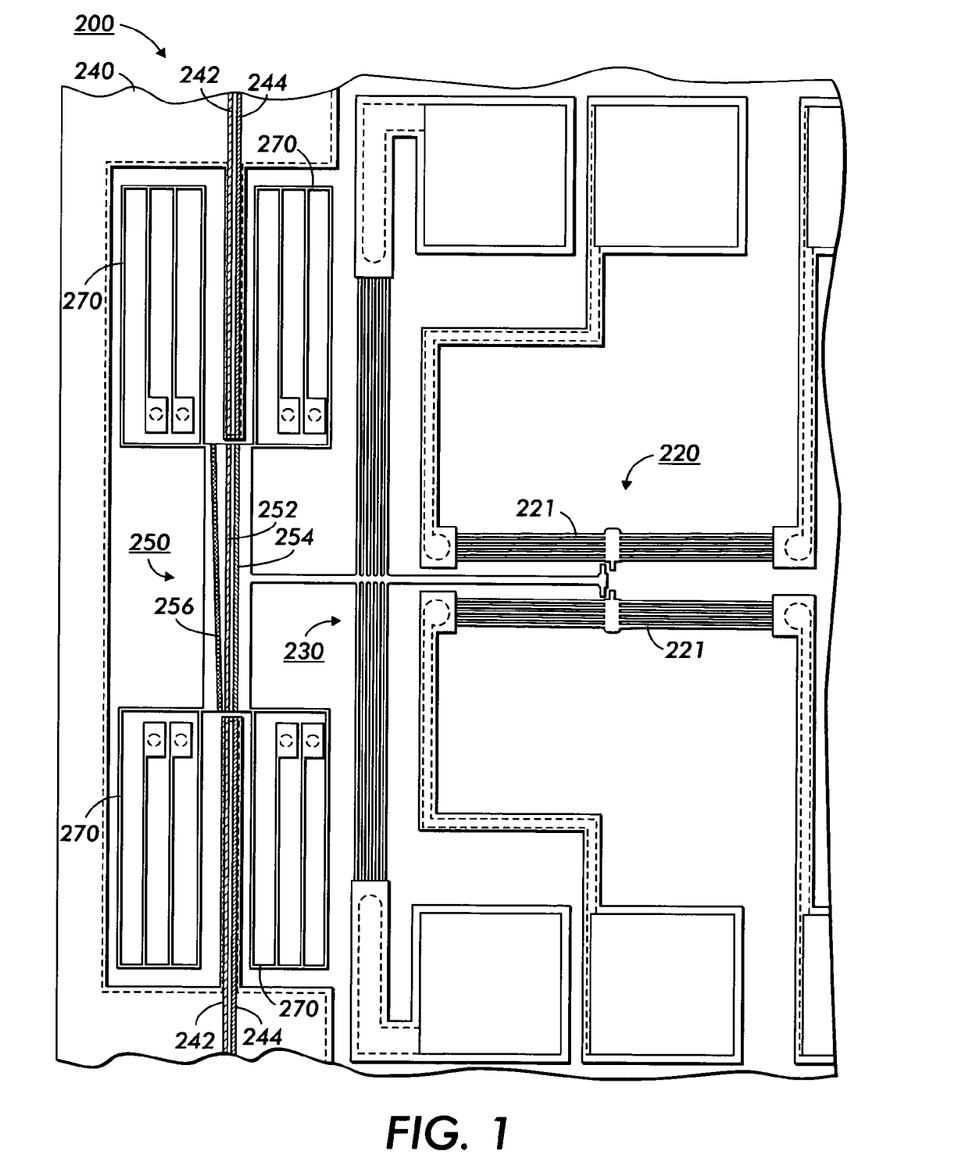
FIG. 1 is a cut away top plane view of an optical MEMS (Micro-Electro-Mechanical System) switch in accordance with the present invention.

Referring now to FIG. 1 there is shown a top plane view of an optical MEMS (Micro-Electro-Mechanical System) switch 200 in accordance with the present invention. All components shown may be fabricated in a single-crystal silicon (SCS) layer 240 using a self-aligned process. The optical MEMS switch utilizes a latching mechanism 220 in association with a thermal drive actuator 230 for aligning a waveguide shuttle 250. The components fabricated in the device layer of an SOI wafer may be released by sacrificial etching of the buried oxide layer. In use the optical MEMS switch 200 may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

Figure 3:
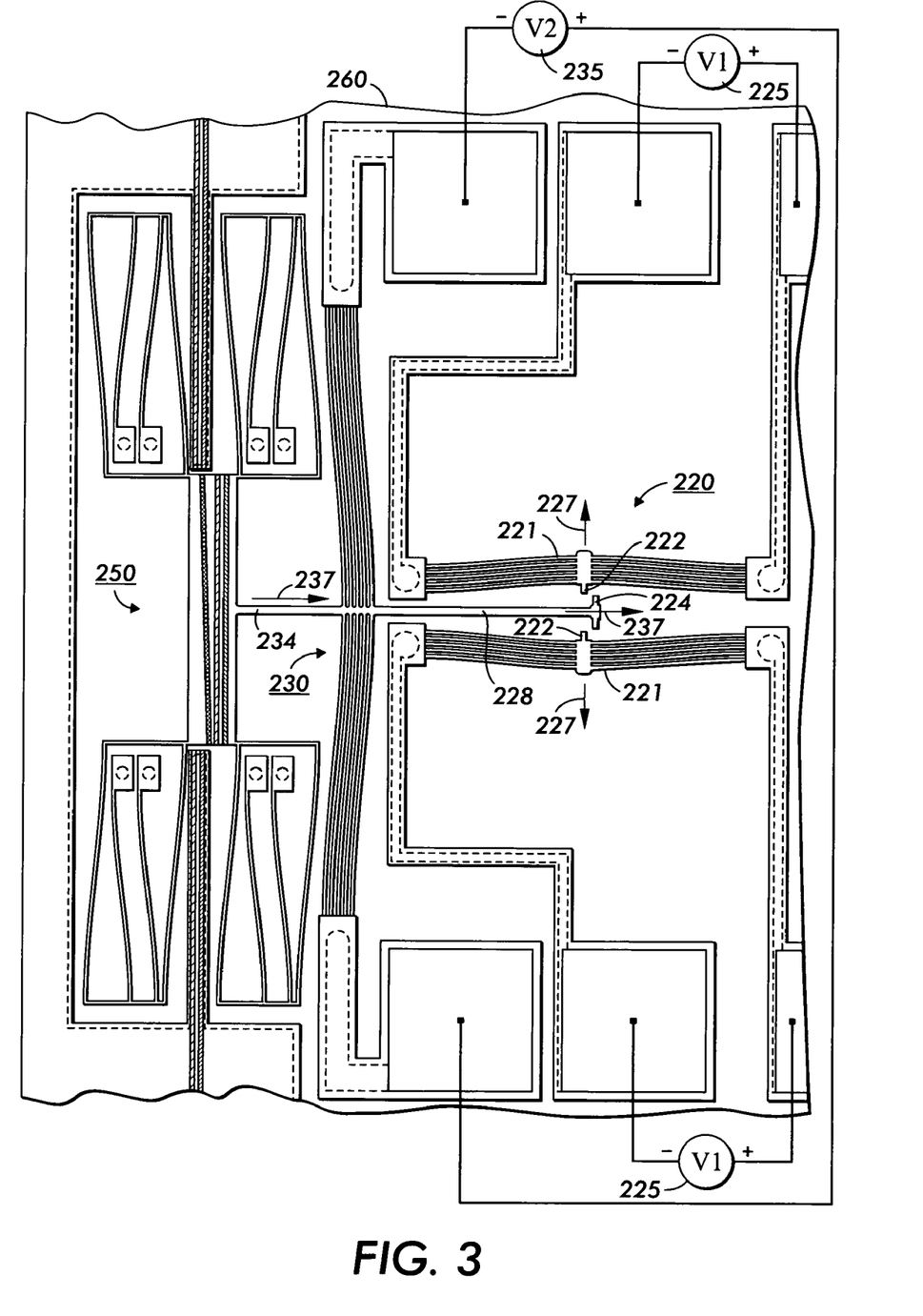
FIG. 3 is a top plane view showing the optical switch actuated by the thermal drive actuator to an overshoot position when the latch is actuated in the open position.

As shown in FIGS. 1 and 3, the optical switch 200 comprises one or more thermal drive actuators 230 having associated during fabrication one or more thermal latch actuators 221, each thermal latch actuator 221 defining translating latch teeth 222. The movable waveguide shuttle platform 250 defines a plurality of optical waveguides 252, 254 and 256 which may be connected with suspension elements shown as one or more folded springs 270. A tether 234 connects the one or more thermal drive actuators 230 to the movable waveguide shuttle platform 250. A linkage 228 connects one or more linkage teeth 224 to the thermal drive actuator 230. The latch teeth 222 are located to determine one or more latched state positions wherein electrical stimuli is timed to actuate the thermal drive 230 and thermal latch actuators 221 so as to switch between equilibrium and latched states. As shown in FIG. 3 the one or more linkage teeth 224 move in an orthogonal direction with respect to the translating latch teeth 222.

Referring once again to FIG. 1, the optical switch 200 is shown in its initial cross-state position. The thermal drive actuator(s) 230 are used to move the waveguide shuttle 250 to its non-equilibrium position (pass-state), while the thermal latch mechanism 220 can maintain the system in the pass-state. The latching thermal actuators 221 are fabricated to provide sufficient force to hold the waveguide shuttle platform 250 in its non-equilibrium (cross-state) position. In operation the optical switch 200 can be unlatched by passing current through the latch actuators 221, thereby opening the latch so the waveguide shuttle platform 250 returns to its equilibrium position (cross-state) under the restoring force provided by the four-folded shuttle springs 270. The thermal drive and latch actuators 230 and 221 are defined during fabrication in the SCS layer 240 and are self-aligned. Similarly, the shuttle waveguides 252, 254 and 256 and stationary waveguides 242, 244 are also defined in the SCS layer 240 and are self aligned. Since the latching mechanism 220, waveguide shuttle platform 250 and waveguides are defined in a self-aligned process during manufacturing, the alignment between the shuttle waveguides 252, 254 and the stationary waveguides 242 and 244 will be near perfect in the x-y plane. Additionally, the optical switch 200, needs to be sufficiently stiff in the z direction, or carefully designed to avoid forces in the z direction, to avoid misalignment in the z direction. Sufficient displacement, restoring and suspension forces can be attained through the design of the thermal drive actuator 230 and the folded springs 270.

The folded springs 270 are used for restoring and suspending the waveguide shuttle platform 250. The folded springs 270 may be designed using the equation for the spring constant $K=(Eab^3)/(8L^3)$ where "a" is the thick dimension of the beams that make up the spring and "b" is the thin dimension of the beam that make up the spring. "L" is the length of the beam that makes up the spring, and "E" is Young's modulus (165 GPa for polysilicon, 190 GPa for single crystal silicon). The length L of the beams and the width of the beams can be adjusted to make the springs sufficiently flexible for the thermal drive actuator(s) 230 to deflect them between the two functional positions ($\Delta x \sim 12$ $\mu$m).

Referring now to FIGS. 1 through 4, the waveguide shuttle platform 250 has moving waveguides 252, 254 and 256 respectively, wherein the waveguide shuttle platform 250 is moved between two positions. The first or equilibrium position (cross-state) has stationary input and output waveguides 242 and 244 aligned with shuttle waveguides 252 and 254. In the second or non-equilibrium position (pass-state) the movable shuttle waveguide 256 connects the stationary input waveguide 244 to the stationary output waveguide 242. The folded springs 270 provide the restoring force to return the switch channel to the cross-state once the latch 220 has been released. Therefore, the movable shuttle platform 250 is pulled or pushed by the one or more thermal drive actuators 230. The one or more drive actuators 230 may also act as suspension elements for the movable shuttle platform 250. The movable shuttle platform 250 can be deflected bi-directionally and has mechanical features to increase or reduce the stiffness of the movable shuttle platform 250 and associated suspension.

Switches can often be described as "latching" or "non-latching". A latching switch reliably preserves the switch state even if the power is removed or lost. A non-latching switch may revert to an unknown position when the power is lost, for example when the current provided to a thermal actuator or electromagnetic solenoid is lost.

Figure 2:
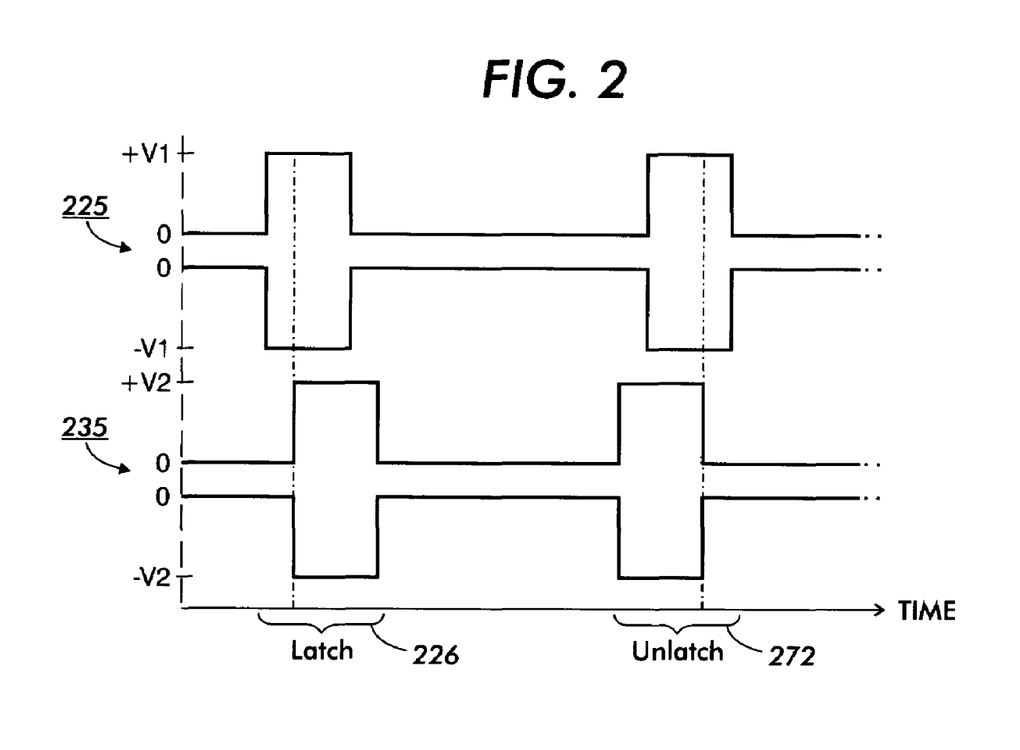
FIG. 2 is a graphical view of a timing diagram for controlling a thermal latch actuator, thermal drive actuator and waveguide shuttle with folded springs.

Referring now to FIGS. 2 and 3 the timing sequence of the signals used to actuate the thermal drive 230 and thermal latch 220 mechanisms and corresponding movement are shown, where the voltages are labeled assuming the potential of the handle wafer or base substrate 260 is zero. The first portion 226 of the timing diagram shows the latching sequence. The first step in the latching sequence is to apply voltages 225 having equal but opposite polarities, a voltage +V1 to one end of each thermal latch actuator 221, and a voltage −V1 to the other end of each latch actuator 221. The voltages 225 on the thermal latch actuators 221 induce ohmic heating in the actuator beams, causing thermal expansion and the subsequent opening 227 of the latch 220 as shown in FIG. 3. While the latch actuator voltage 225 is still applied, the drive actuator 230 is stimulated a second set of voltages 235 having equal but opposite polarities, a voltage +V2 at one end and a voltage −V2 at the other end.

Figure 4:
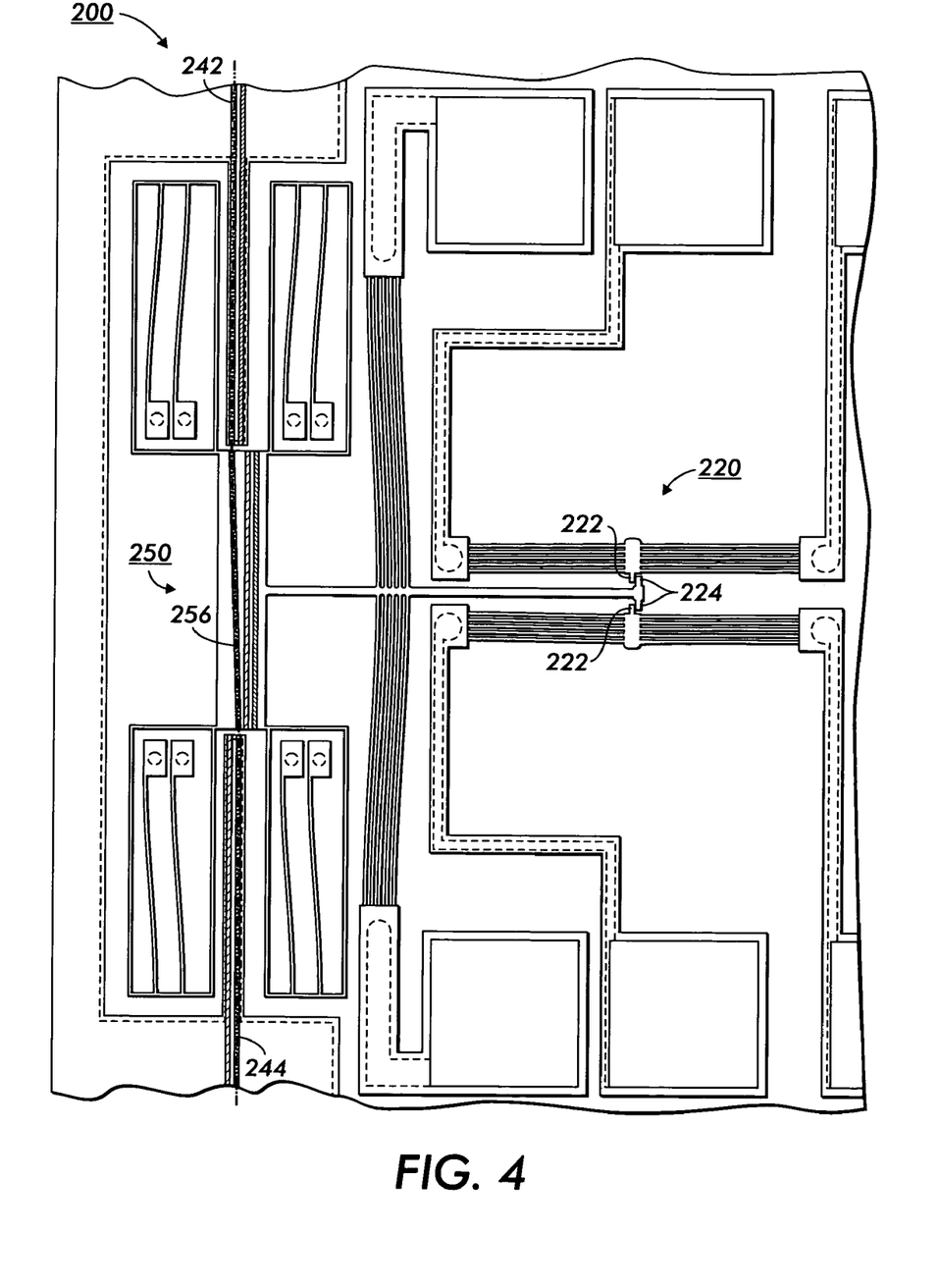
FIG. 4 is a top plane view showing the latching mechanism in the latched position.

FIG. 3 shows how the resulting thermal expansion of the thermal drive actuator 230 sufficient to move the waveguide shuttle 250 and linkage having linkage teeth 224. The drive actuator 230 is moved far enough to the right 237 for the linkage teeth 224 to be well to the right side of a pair of latch teeth 222 supported by thermal actuators 221. Next the thermal latch actuator voltages return to zero, and the latch closes. To finish the latching sequence, the drive actuator voltages return to zero. As the drive actuator 230 cools, the linkage teeth 224 are drawn in tension against the latch teeth 222 which holds the shuttle 250 in the desired latched position as shown in FIG. 4. The shuttle waveguide 256 now connects the stationary waveguide 244 to stationary waveguide 242. To return the optical switch to its original state, the same sequence of voltages are applied in the reverse timing, as shown in the unlatch portion 272 of FIG. 2.

It should be noted that, although the timing diagram shown in FIG. 2 depicts square wave voltage pulses, this depiction is meant to be illustrative only of the basic timing, and does not preclude the use of other waveforms. Furthermore, the voltages applied to the thermal actuators need not be symmetric about zero. However, the use of equal but opposite polarity pulses, as described above, results in a constant zero voltage at the center of each actuator throughout the latch and unlatch cycle, which reduces electrostatic forces between the thermal actuators and the handle wafer 260.

Figure 5:
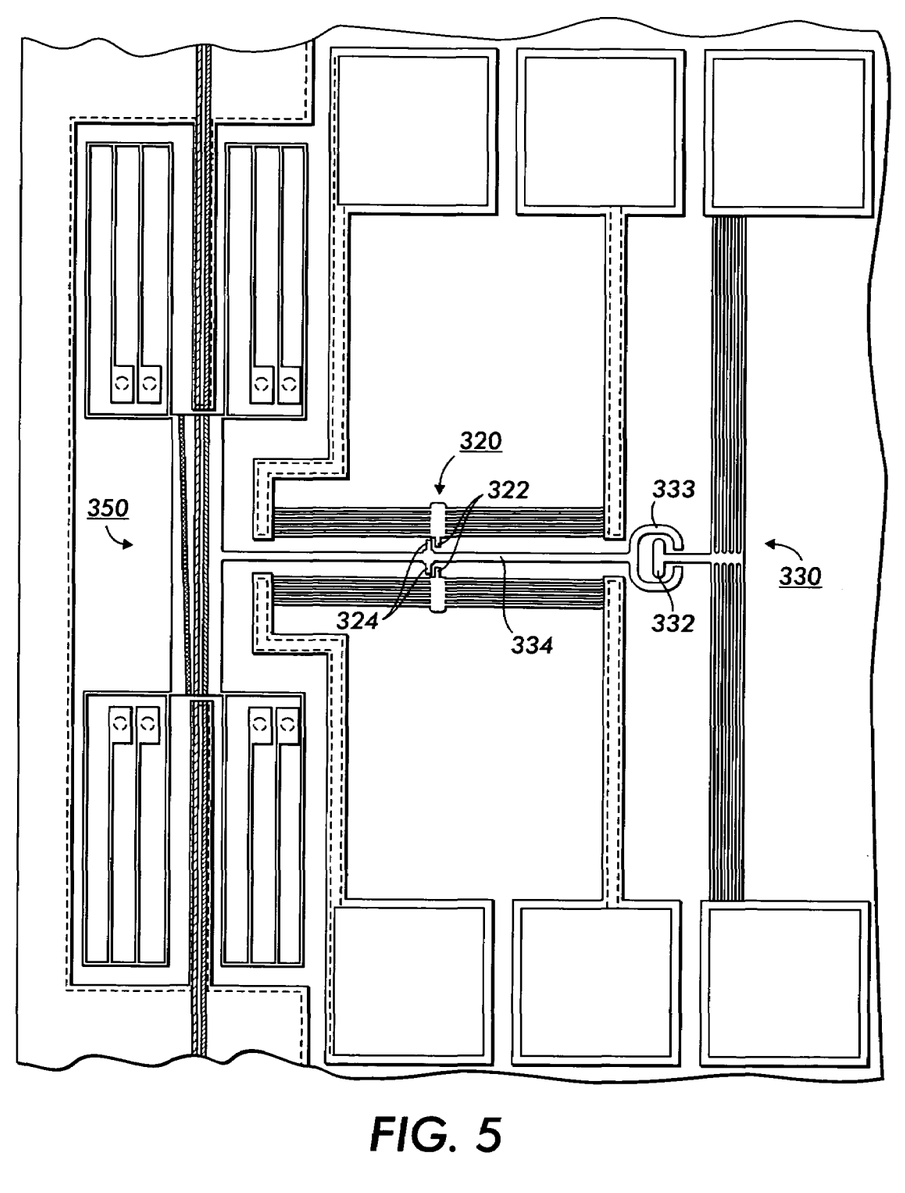
FIG. 5 is a cut away top plane view of an optical MEMS switch with an in-plane hitch and latch teeth in accordance with another embodiment of the present invention.
Figure 6:
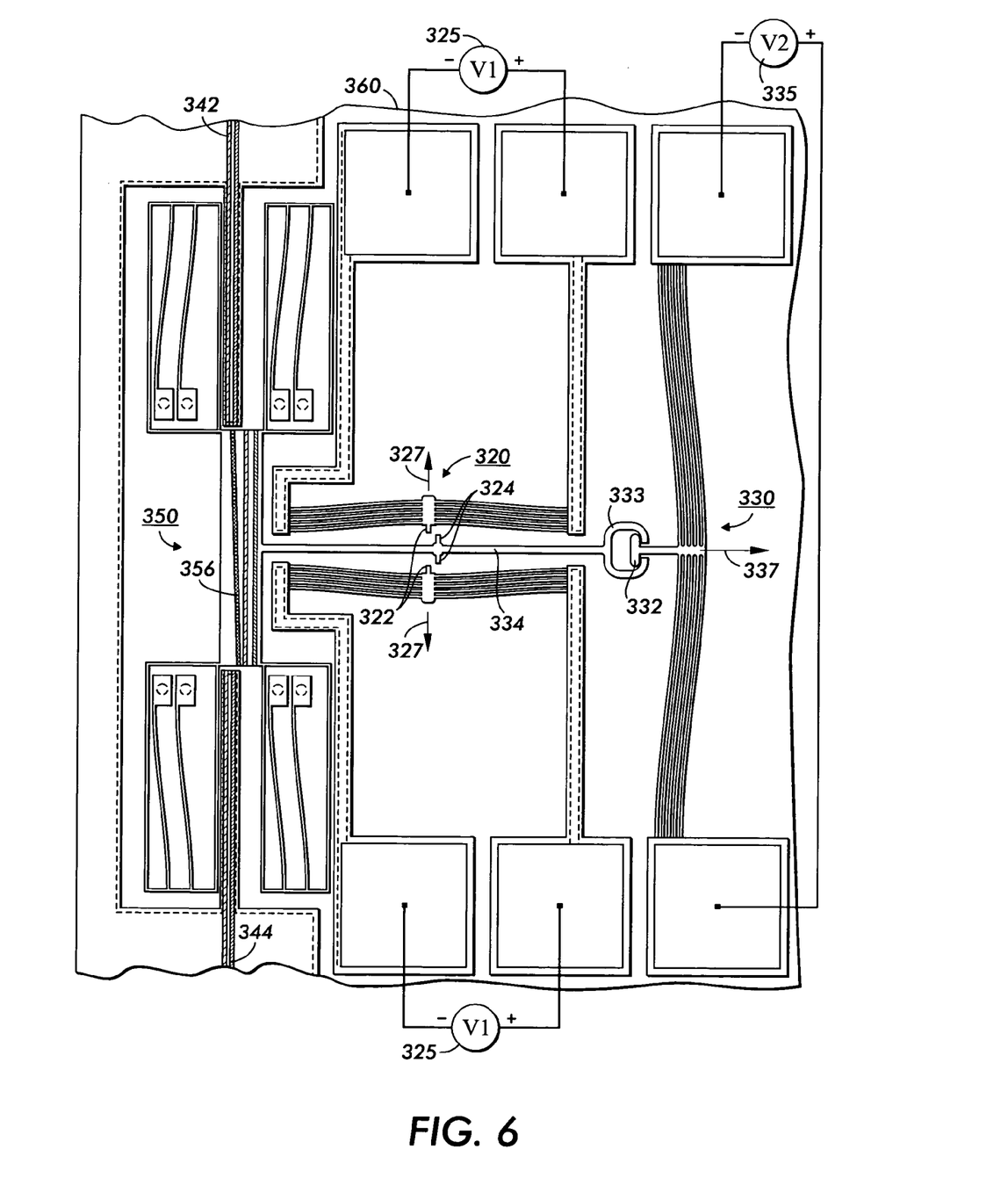
FIG. 6 is a cut away top plane view of an optical MEMS switch illustrating the in-plane hitch that is engaged while the drive switch is actuated by the thermal drive actuator to an overshoot position with the latch actuated in the open position.
Figure 7:
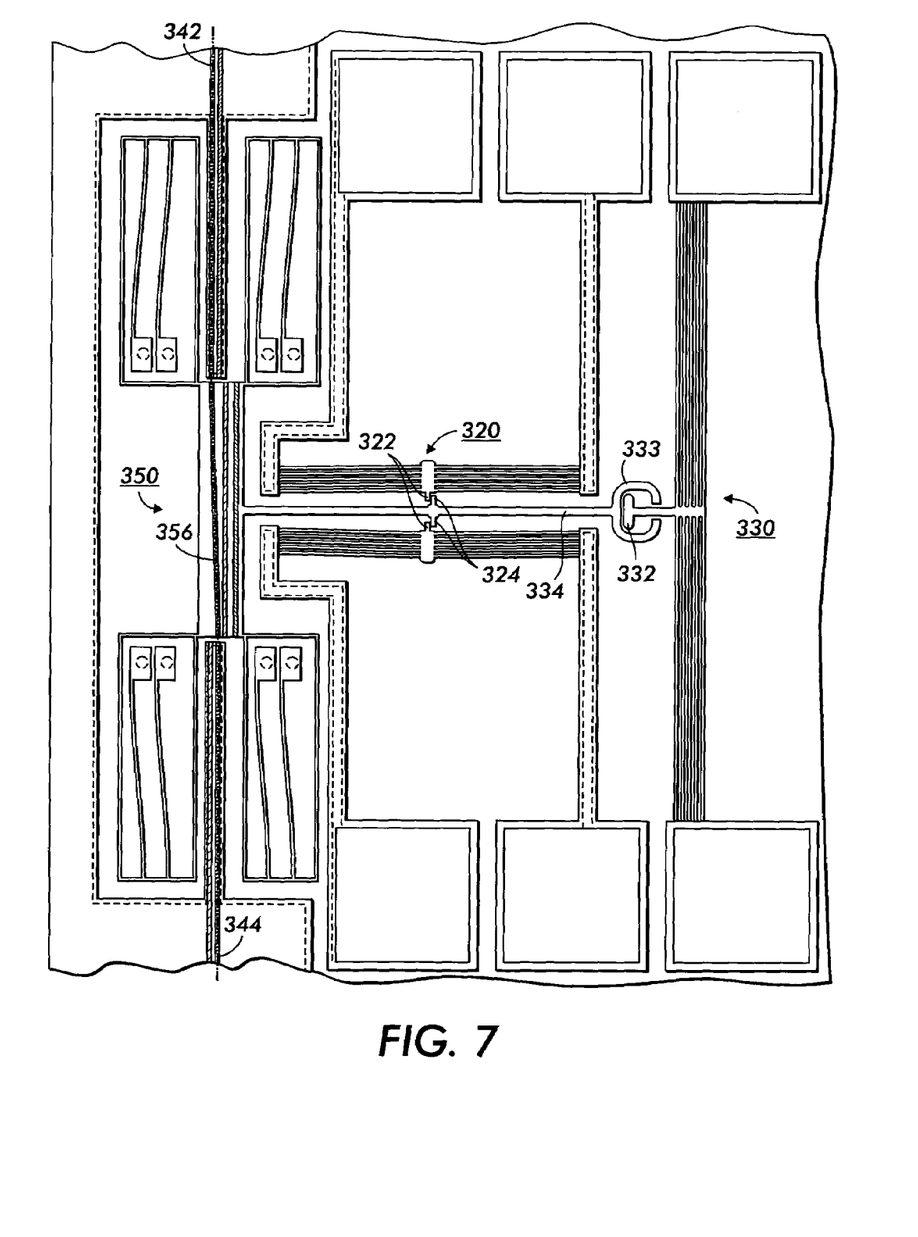
FIG. 7 is a cut away top plane view of an optical MEMS switch illustrating the optical switch in its latched state with the thermal drive actuator returned to its equilibrium state.

In another embodiment shown in FIGS. 5 through 7, an additional strain relief element is included to reduce stress in the latched state. A "hitch" 332 and 333, shown on the right side of FIG. 5, transfers the pulling force to displace the shuttle 350 during drive actuation. After latching, the hitch 330 allows the drive actuator 320 to return to its initial state without compressing the linkage 334 between the drive and the latch, thereby decreasing the force load at the engaged teeth 322 and 324.

Referring to FIGS. 5 through 7, there is shown the actuator 330 and in-plane hitch 332 and 333 respectively. The actuation of this system is analogous to the system embodiment depicted in FIG. 1. Referring once again to FIG. 2, the timing sequence of the signals is shown used to actuate the drive and latch mechanisms, where the voltages are labeled assuming the potential of the handle wafer or base substrate 360 is zero. Once again the first step in the latching sequence is to apply a pair of voltages 325, +V1 to one end of each latch actuator, and a voltage −V1 to the other end of each latch actuator. The voltages on the latch actuators induce ohmic heating in the actuator beams, causing thermal expansion and the subsequent opening of the latch as shown in FIG. 6. While the latch actuator voltage is still applied, the drive actuator 330 is stimulated with a pair of voltages 335, +V2 at one end and a voltage −V2 at the other end.

FIG. 6 shows how the resulting thermal expansion 337 of the drive actuator 330 is sufficient to move the waveguide shuttle 350 and linkage 334 far enough to the right for the linkage teeth 324 to be well to the right side of the latch teeth 322. Next the latch actuator voltages return to zero, and the latch closes. To finish the latching sequence, the drive actuator voltages return to zero. As the drive actuator cools, the linkage teeth 324 are drawn in tension against the latch teeth 322 which holds the switch in the desired latched position as shown in FIG. 7. The shuttle waveguide 356 now connects the stationary waveguide 344 with stationary waveguide 342. To return the switch to its original state, the same sequence of voltages are applied in the reverse timing, as shown in the unlatch portion of FIG. 2.

The switches and the waveguides are made together on a SOI wafer using widely available semiconductor processing equipment. Such on-chip integration avoids the complex alignment issues associated with manually connecting different and larger components with optical fibers, and avoids the cost and space associated with manufacturing, assembling and packaging the separate components of optical switches. On-chip integration with other components can drive down the cost of manufacturing switches and installation of these complicated devices by a factor of ten or more. Currently, these components cost over $1,000 per channel.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An optical switch, comprising:
one or more thermal drive actuators having associated one or more thermal latch actuators wherein each thermal latch actuator defines translating latch teeth;

a movable waveguide shuttle platform defining a plurality of optical waveguides wherein said movable waveguide shuttle platform is connected by suspension elements;

a tether connecting said one or more thermal drive actuators to said movable waveguide platform; and a linkage defining one or more linkage teeth for orthogonal connection to said translating latch teeth of said one or more thermal latch actuators located to determine one or more latched state positions wherein electrical stimuli is timed to actuate said one or more thermal drive and thermal latch actuators so as to switch between equilibrium and latched states.

2. The optical switch according to claim 1, wherein said suspension elements are one or more folded springs.

3. The optical switch according to claim 1, wherein said one or more drive actuators are also said suspension elements for said movable shuttle platform.

4. The optical switch according to claim 1, wherein said movable shuttle platform may be deflected bi-directionally.

5. The optical switch according to claim 1, wherein said movable shuttle platform has mechanical features to increase or reduce the stiffness of said movable shuttle platform and said associated suspension.

6. The optical switch according to claim 1, wherein said latching switch is fabricated in the device layer of an SOI wafer.

7. The optical switch according to claim 1, wherein said latching switch is fabricated in the device layer of an SOI wafer and released by sacrificial etching of a buried oxide layer.

8. The optical switch according to claim 1, wherein said electrical stimuli to said latch actuators are biased to reduce electrostatic forces acting on said actuator.

9. The optical switch according to claim 1, wherein said electrical stimuli to said latch actuators are biased to reduce or eliminate voltage differences between contacting surfaces on said latching teeth and said linkage teeth.

10. An optical multiple state latching switch comprising:
one or more thermal drive actuators;
one or more thermal latch actuators with associated translating latch teeth;
a movable shuttle platform defining optical waveguides connected to suspension elements;
a tether connecting said movable shuttle platform to said translating latch teeth located to determine one or more latched state positions;
a linkage defining one or more linkage teeth for orthogonal connection to said translating latch teeth connecting said tether to a hitch attached to said one or more thermal drive actuators; and
electrical stimuli timed to actuate said thermal drive and thermal latch actuators so as to change between equilibrium and latched states.

11. The optical multiple state latching switch according to claim 10 wherein said suspension elements are one or more folded springs.

12. The optical multiple state latching switch according to claim 10 wherein said movable shuttle platform is pulled or pushed by said one or more thermal drive actuators.

13. The optical multiple state latching switch according to claim 10 wherein said one or more drive actuators are separated from said movable shuttle platform by said hitch.

14. The optical multiple state latching switch according to claim 10 wherein said movable shuttle platform can be deflected bi-directionally.

15. The optical multiple state latching switch according to claim 10 wherein said electrical stimuli to said one or more thermal drive actuators are biased to reduce or eliminate voltage differences between contacting surfaces on said latch teeth and said linkage teeth.

16. An optical switch, comprising:
a plurality of optical waveguides formed on a movable shuttle platform for switching optical states wherein the optical switch is state changed by utilizing a latching mechanism in association with a thermal drive actuator for aligning said plurality of optical waveguides to a plurality of optical stationary waveguides, wherein
a tether connects said thermal drive actuator and said movable shuttle platform, and wherein
a linkage is provided for connecting said thermal drive actuator to translating latch teeth of one or more latch actuators.

17. The optical switch according to claim 16, wherein said movable shuttle platform is suspended and connected by one or more folded springs.

18. The optical switch according to claim 16, wherein the linkage connecting said thermal drive actuator to said translating latch teeth is located to determine one or more latched state positions wherein electrical stimuli is timed to actuate said drive and latch actuators so as to change between equilibrium and latched states.

* * * * *